(12) United States Patent
Hruby et al.

(10) Patent No.: US 7,319,804 B2
(45) Date of Patent: Jan. 15, 2008

(54) RADIUS LIMITER AND ARRANGEMENT

(75) Inventors: Kevin L. Hruby, Minnetonka, MN (US); Mike Follingstad, Prior Lake, MN (US); Oscar Fernando Bran De Leon, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 178 days.

(21) Appl. No.: 11/069,886

(22) Filed: Feb. 28, 2005

(65) Prior Publication Data

US 2006/0193585 A1 Aug. 31, 2006

(51) Int. Cl.
*G02B 6/00* (2006.01)

(52) U.S. Cl. ............ 385/136; 385/135; 385/134; 385/137; 385/138

(58) Field of Classification Search ......... 385/135–147
See application file for complete search history.

(56) References Cited

U.S. PATENT DOCUMENTS

| 6,307,997 | B1 * | 10/2001 | Walters et al. ........... 385/134 |
| 6,398,149 | B1 * | 6/2002 | Hines et al. ............. 242/399 |
| 6,438,311 | B1 * | 8/2002 | Zarnowitz ............... 385/135 |
| 6,468,112 | B1 | 10/2002 | Follingstad et al. |
| 6,532,332 | B2 | 3/2003 | Solheid et al. |
| 6,658,193 | B1 * | 12/2003 | Ati et al. ............... 385/136 |
| 2003/0108322 | A1 * | 6/2003 | Douglas et al. .......... 385/136 |
| 2003/0119385 | A1 | 6/2003 | Elliot et al. |

OTHER PUBLICATIONS

Value-Added Module System, ADC Telecommunications, 4 pages, (Jun. 1998).

* cited by examiner

*Primary Examiner*—Frank G. Font
*Assistant Examiner*—Eric Wong
(74) *Attorney, Agent, or Firm*—Merchant & Gould P.C.

(57) ABSTRACT

A cable radius limiter having a radius limiting surface that prevents damage to cables due to excessive bending. The cable radius limiter includes mounting structure and cable retaining structure arranged such that the limiter can be operably oriented and mounted to a mounting bracket in both a first mounting orientation and a second mounting orientation. The mounting bracket includes a number of fingers to which a plurality of the cable radius limiters is secured.

24 Claims, 4 Drawing Sheets

RADIUS LIMITER AND ARRANGEMENT

TECHNICAL FIELD

The present invention relates generally to devices and methods for enhancing cable management of a telecommunications system. More particularly, the present invention relates to a radius limiter arrangement for use in telecommunications systems.

BACKGROUND

Telecommunications systems commonly include cables (e.g., fiber optic cables or copper twisted pair cables) for interconnecting pieces of telecommunications equipment. Telecommunication racks typically hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves organizing cables so that the cables run or lie in an orderly manner. Because telecommunication systems often have different cable routing requirements, adaptability of the devices used to manage and organize cables is desirable. Cable management also involves preventing damage to the cables, such as unnecessary or excessive displacement of fiber optic cables. Unnecessary or excessive bending can damage cables. For example, the bending of the fibers can cause attenuation and loss of signal strength, which can even result in the fiber breaking and a complete loss of signal transmission through the fiber.

In general, cable management improvement has been sought, generally to efficiently and effectively manage cables by providing a device that prevents cable damage and is also adaptable to a variety of telecommunications applications.

SUMMARY

One aspect of the present invention relates to a cable radius limiter having mounting structure and cable retaining structure arranged such that the limiter can be operably oriented in both a first mounting orientation and a second mounting orientation.

Another aspect of the present invention relates to a radius limiter arrangement for managing cable of a telecommunications system. The arrangement includes a mounting bracket having mounting structure for securing the radius limiter arrangement to structure of the telecommunications system, and a plurality of cable radius limiters secured to the mounting bracket. The cable radius limiter can be operably secured to the mounting bracket in both a first mounting orientation and a second mounting orientation.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

FIGS. 1-6 illustrate one embodiment of a radius limiter 10 having features that are examples of how inventive aspects in accordance with the principles of the present disclosure may be practiced.

Figure 1:
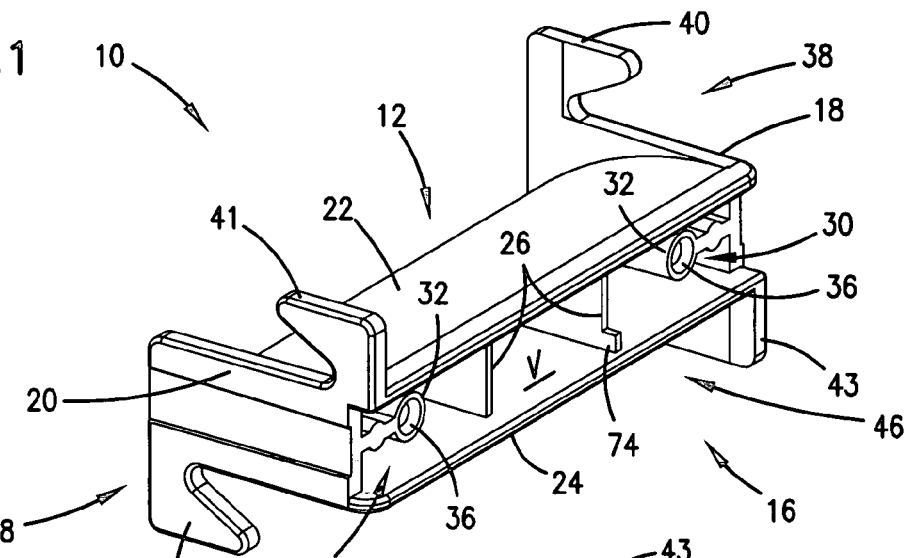
FIG. 1 is a rear perspective view of one embodiment of a radius limiter, in accord with the principles of the present disclosure.
Figure 2:
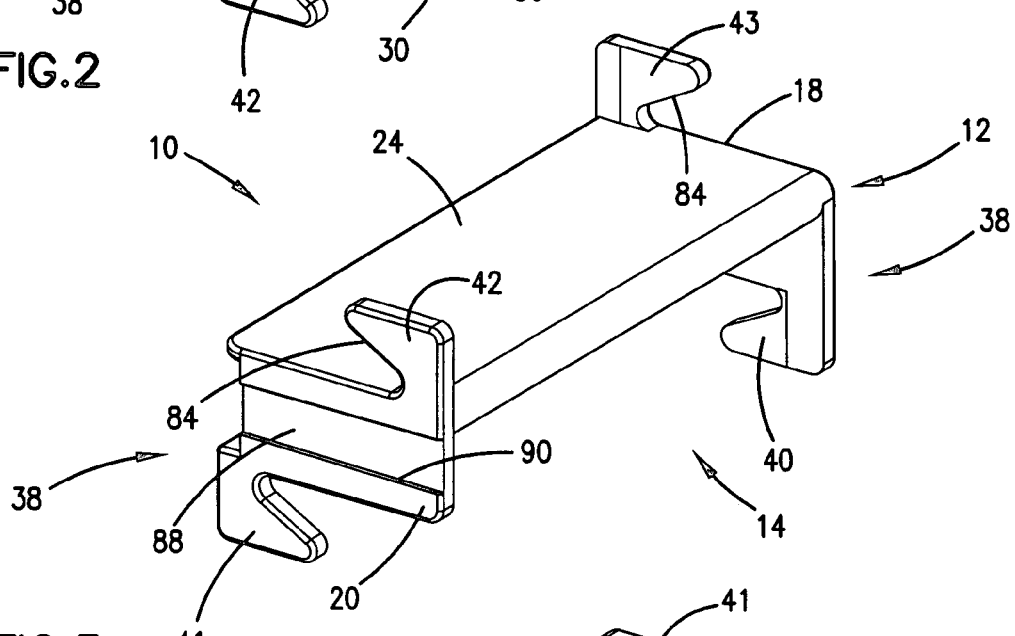
FIG. 2 is a first front perspective view of the radius limiter of FIG. 1 shown in a first mounting orientation.
Figure 3:
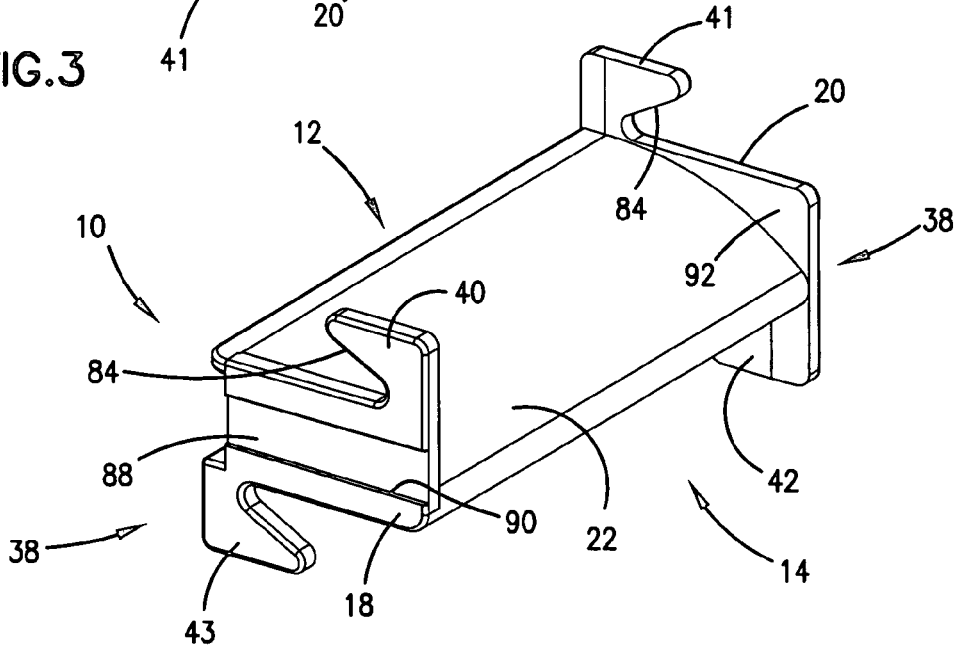
FIG. 3 is a second front perspective view of the radius limiter of FIG. 1 shown in a second mounting orientation.

Referring to FIGS. 1-3, the radius limiter 10 includes a radius limiter body 12 having a front 14 positioned opposite from a rear 16, and a first side 18 positioned opposite from a second side 20. A first surface 22 and a second opposite surface 24 extend between the front 14 and the back 16, and between the first and second sides 18, 20 of the radius limiter body 12.

Preferably, one of the first and second surfaces 22, 24 is a radius limiting surface configured to limit bending of cables extending or running along the surface. In the illustrated embodiment, the first surface 22 is a radius limiting surface. That is, the first surface 22 is a curved surface having a convex curvature that limits or minimizes the bend radius of cable to prevent possible damage. In the illustrated embodiment, the convex curvature provides at least a 1.5 inch radius bend protection for cables extending along the curved surface 22.

The second opposite surface 24 of the radius limiter body 12 is a generally flat or planar surface. Each of the first and second surfaces 22, 24 converge at the front 14 of the radius limiter body 12. At the rear 16 of the radius limiter body 12, the surfaces 22, 24 are spaced apart from one another. A volume V is defined between the first and second surfaces 22, 24 (FIG. 1). Gussets 26 can be provided within the volume V to support the spaced configuration of the first and second surfaces 22, 24.

Figure 4:
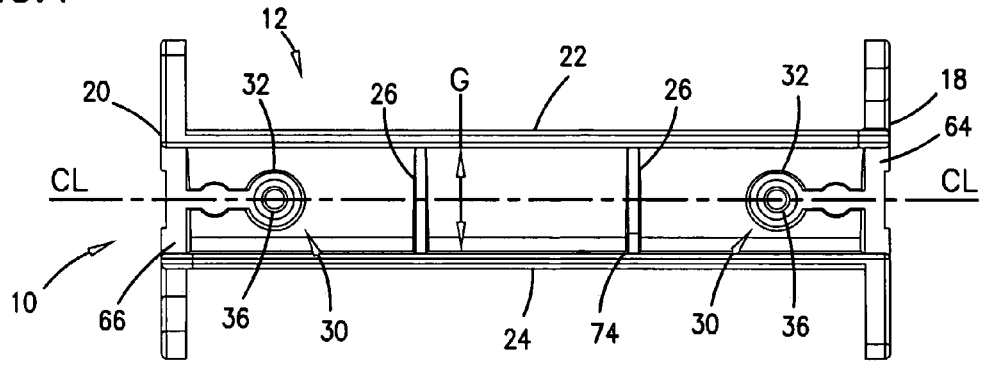
FIG. 4 is a rear elevation view of the radius limiter of FIG. 1.

Referring to FIG. 1 and FIG. 4, the radius limiter 10 includes mounting structure 30 used to secure to the cable radius limiter 10 to a mounting bracket 50 (FIG. 7), for example. The mounting structure 30 is accessible from the rear 16 of the radius limiter body 12. In the illustrated embodiment, the mounting structure 30 is located within the volume V defined between the first and second surfaces 22, 24 of the radius limiter body 12.

Figure 7:
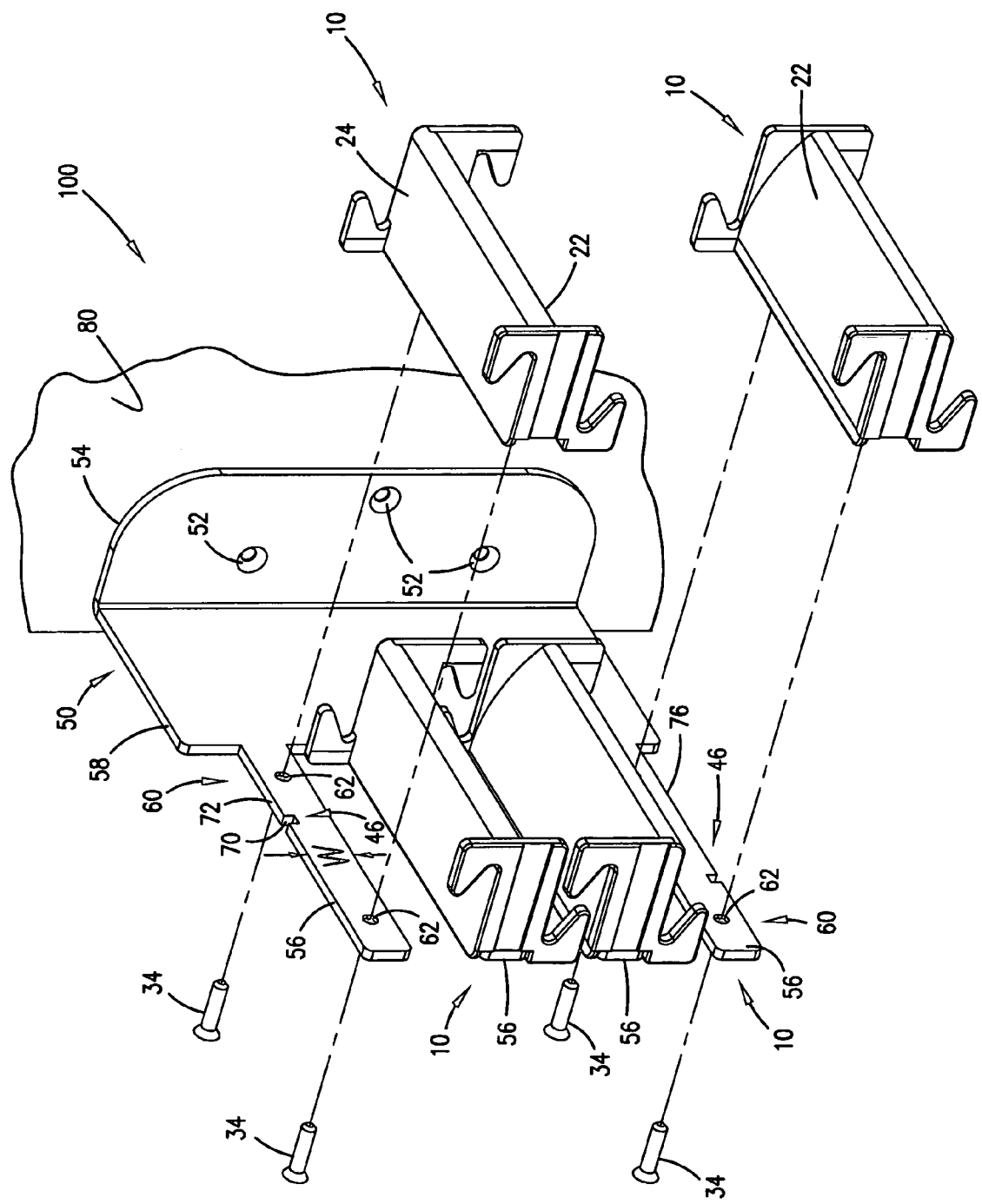
FIG. 7 is an exploded front perspective view of a radius limiter arrangement, in accord with the principles of the present disclosure, showing a number of radius limiters of FIG. 1 and a radius limiter mounting bracket.

In the illustrated embodiment, the mounting structure 30 includes first and second fastener mounts 32 configured to receive a fastener 34 (FIG. 7). The fastener mounts 32 define a bore 34 that can be used with thread-forming fasteners (e.g., fasteners 34). In the alternative, the bore 34 can include internal threads for use with standard threaded fasteners. Other types of mounting structure, such as snap mounts or tab mounts can also be used. As shown in FIG. 4, the fastener mounts 32 are located along a centerline CL of the radius limiter 10.

Referring back to FIGS. 1-3, cable retaining structure 38 is located at the sides 18, 20 of the radius limiter body 12. The cable retaining structure 38 is configured and arranged to retain cables between the sides 18, 20 of the radius limiter body 12. In the illustrated embodiment, the cable retaining structure 38 includes cable retaining tabs 40-43. The cable retaining structure 38 further includes a corner portion 92 (FIG. 3) of the second side 20 of the radius limiter body 12. In use, the cable retaining tabs 40-43 and the corner portion 92 of the cable retaining structure 38 are designed to prevents the cables from inadvertently falling off the curved surface 22 of the cable radius limiter 10 when the cables 82 experience vibrations or movement, for example.

The cable retaining tabs 40-43 extend in a direction generally outward from the first and second surfaces 22, 24 of the radius limiter body 12. In the illustrated embodiment, the cable retaining tabs 40-43 include forward tabs 40, 42 and rearward tabs 41, 43. The forward tabs 40, 42 are located at the front 14 of the radius limiter body 12, and the rearward tabs 41, 43 are located at the rear 16 of the radius limiter body 12. The cable retaining structure 38 can generally be described as including a pair of forward and rearward tabs (i.e., tabs 42-43 and tabs 40-41) located adjacent to each of the first and second surfaces 22, 24 of the radius limiter body 12. In the alternative, the cable retaining structure 38 can generally be described as including a pair of forward and rearward tabs (i.e., tabs 40-43 and tabs 41-42) at each of the sides 18, 20 of the radius limiter body 12.

Preferably, the cable radius limiter 10 is molded from a plastic material as a single unitary construction. In other embodiments, the cable radius limiter 10 can be constructed from other material, such as metal, and/or be an assembly of components having features herein described.

The radius limiter 10 of the present disclosure is constructed for use in managing cables of telecommunications systems. FIG. 7 illustrates one embodiment of a radius limiter arrangement 100 that utilizes a plurality of the radius limiters 10.

As shown in FIG. 7, the plurality of cable radius limiters 10 of the radius limiter arrangement 100 are secured to the mounting bracket 50. In one embodiment, the mounting bracket is a sheet metal construction; although brackets formed or assembly from other material constructions is contemplated.

In use, the mounting bracket 50 of the radius limiter arrangement 100 can be mounted to structure 80 of a telecommunications system, such as a telecommunication rack, a telecommunications panel, or an interior wall of a cabinet, for example. The mounting bracket 50 includes mounting structure or holes 52 formed in a flange portion 54 of the bracket 50. The holes 52 receive fasteners (not shown) that secure the radius limiter arrangement 100 to the structure 80 of the telecommunications system.

The mounting bracket 50 also includes a plurality of spaced apart extensions or fingers 56 extending from a base portion 58 of the bracket 50. Each one of the fingers 56 is generally planar and configured to receive one of the cable radius limiters 10. In an alternative embodiment, the plurality of cable radius limiters 10 can be mounted directly to similarly configured structure 80 of the telecommunications system. That is, fingers can extend from panel or bracket structure of the telecommunications system, and the radius limiters 10 can mount directly to the fingers of the structure (not shown).

The fingers 56 of the mounting bracket 50 include securing structure 60 for securing one of the limiters 10 of the plurality of cable radius limiters 10 to each of the fingers. In the illustrated embodiment, the securing structure 60 includes holes 62 that receive the fasteners 34. The fasteners 34 extend through the holes 62 and engage the fastener mounts 32 (FIG. 1) located within the volume V of the radius limiter body 12.

Figure 5:
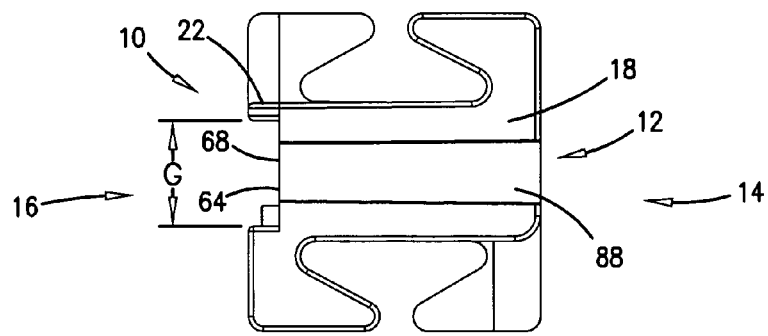
FIG. 5 is a side elevation view of the radius limiter of FIG. 4.
Figure 6:
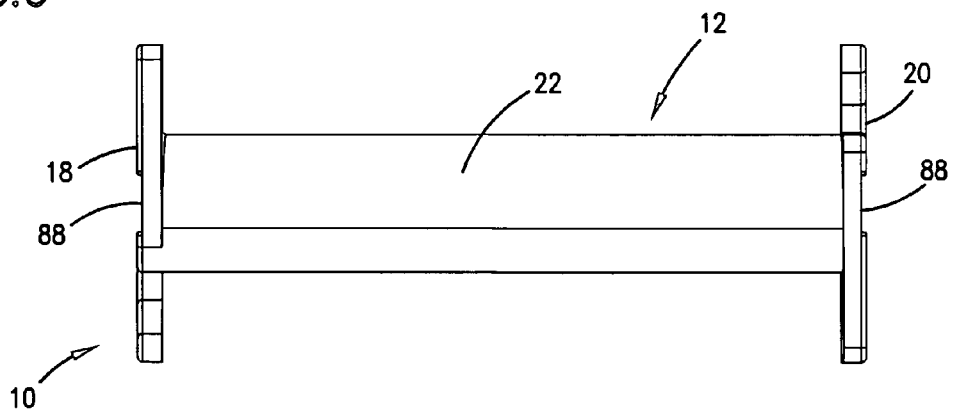
FIG. 6 is a front elevation view of the radius limiter of FIG. 5.

Each of the fingers 56 of the mounting bracket 50 has a width W. The width W is sized so that the finger 56 fits between a gap G (FIG. 5) defined by the first and second surfaces 22, 24 of the radius limiter body 12. Referring to FIG. 5, the width W of the finger is also sized to fit within notches 68 formed at the sides 18, 20 of the radius limiter body 12. The first and second surfaces 22, 24 extend beyond a rear edge 64, 66 of the sides 18, 20 of the radius limiter body 12 to form the notches 68 and the gap G.

Referring again to FIGS. 2 and 3, the cable radius limiter 10 can be selectively oriented in both a first mounting orientation (FIG. 2) and a second mounting orientation (FIG. 3), depending upon the particular requirements of the telecommunications system. In the second mounting orientation, the cable radius limiter 10 is flipped 180 degrees relative to the first mounting orientation. That is, when mounted to the structure 80 of the telecommunications system (FIG. 7), in the first mounting orientation, the curved surface 22 faces in a downward direction, and in the second mounting orientation, the curved surface 22 faces in an upward direction.

The arrangement of the mounting structure 30 and the cable retaining structure 38 of the cable radius limiter 10 provide this reversible or universal feature. In particular, the mounting structure 30 is configured and arranged along the centerline CL of the radius limiter body 12 so that the cable radius limiter 10 can be operably oriented and mounted relative to the structure 80 of the telecommunications system in both the first and second mounting orientations. In addition, the cable retaining structure 38 is configured and arrangement so that the radius limiter body 12 can be operably oriented and mounted relative to the structure 80 of the telecommunications system. What is meant by operably oriented is that the cable radius limiter 10 functions as intended to limit the bend radius of cables and prevent cable damage. In particular, cables can be routed along the curved surface 22 of the cable radius limiter 12 so that the cables 82 (FIG. 8) run upward or downward, depending upon the selected orientation. This feature reduces costs associated with manufacturing in that a cable radius limiter 10 can be produced for use in either mounting orientation.

In general, the arrangement 100 can include a number of cable radius limiters 10 mounted in different orientations to accommodate the specific requirements of a particular telecommunications system. In the illustrated embodiment of FIG. 8, the arrangement some of the radius limiters 10 are oriented in the first mounting orientation and some of the radius limiters 10 are oriented in the second mounting orientation. It is also contemplated that all the cable radius limiters 10 can be mounted in the first mounting orientation or all in the second mounting orientation.

Referring again to FIGS. 2 and 3, each of the cable radius limiters 10 can include a region for placement of indicia or labels for purposes of identifying the cables 82 carried within the particular arrangement. In the illustrated embodiment, the sides 18, 20 of the cable radius limiters 10 include a shallow channel or recessed area 88 for placement of indicia or labels. Edges 90 of the recessed area 88 can be used to align labels that adhere to the sides 18, 20 of the limiters 10.

Referring back to FIGS. 1 and 7, the mounting bracket 50 and the cable radius limiters 10 of the radius limiting arrangement 100 can include alignment structure 46 that determines or dictates in which of the first mounting orientation or the second mounting orientation the cable radius limiter 10 is mounted. As previously described, the cable radius limiter 10 can be operably oriented and mounted in both of the first and second mounting orientations; however, the alignment structure 46 of the mounting bracket 50 can be arranged to determine the particular orientation of each radius limiter 10. For example, a particular cable radius limiter 10 can first be mounted on one finger 56 having alignment structure 46 requiring attachment in the first mounting orientation, and then subsequently detached, flipped and mounted to another finger having alignment structure 46 requiring attachment in the second mounting orientation.

In the illustrated embodiment, the alignment structure 46 permits alignment or orientation of the cable radius limiter 10 in only one of a pre-selected mounting orientation (i.e., one of the first or second mounting orientations). This expedites assembly of the arrangement 100 whereby the alignment structure 46 of the mounting bracket 50 accepts the cable radius limiter 10 in only one of the first or second mounting orientations, as predetermined by the requirements of the telecommunications system. An assembler cannot thereby mistakenly mount the cable radius limiters 10 in a non-accommodating orientation, which can lead to time and costs associated with re-assembling an arrangement having specific requirements.

In the illustrated embodiment, the alignment structure 46 includes an alignment keyway or notch 70 (FIG. 7) formed in the mounting bracket 50 and an alignment tab or pin 74 formed on the cable radius limiter 10 (FIGS. 1 and 4). The alignment notch 70 of the mounting bracket 50 is formed along either an upper edge 72 or a lower edge 76 of each of the fingers 56. In the upper most finger shown in FIG. 7, the alignment notch 70 is formed in the upper edge 72 of the finger 56, and in the lower most finger, the alignment notch 70 is formed in the lower edge 76 of the finger. Each of the alignment notches 70 of the mounting bracket 50 is configured to receive the alignment pin 74 (FIGS. 1 and 4) of the cable radius limiter 10. As shown in FIGS. 1 and 4, the alignment pin 74 extends from one of the gussets 26 located within the volume V of the radius limiter body 12.

When mounting the cable radius limiter 10 to the mounting bracket 50, the alignment pin 74 of the cable radius limiter 10 aligns with the alignment notch 70 of the finger 56. Placement of the alignment notch 70 on either the upper or lower edge 72, 76 of the finger determines the mounting orientation of the cable radius limiter 10.

In the alternative, the alignment structure can include a notch formed in the radius limiter body 12 of the cable radius limiter 10 and a tab or pin formed on the finger 56 of the mounting bracket 50. As can be understood, the arrangement 100 can also be made without alignment notches or pins so that the limiters 10 can be mounted to a particular finger 56 in both the first and second mounting orientations.

Figure 8:
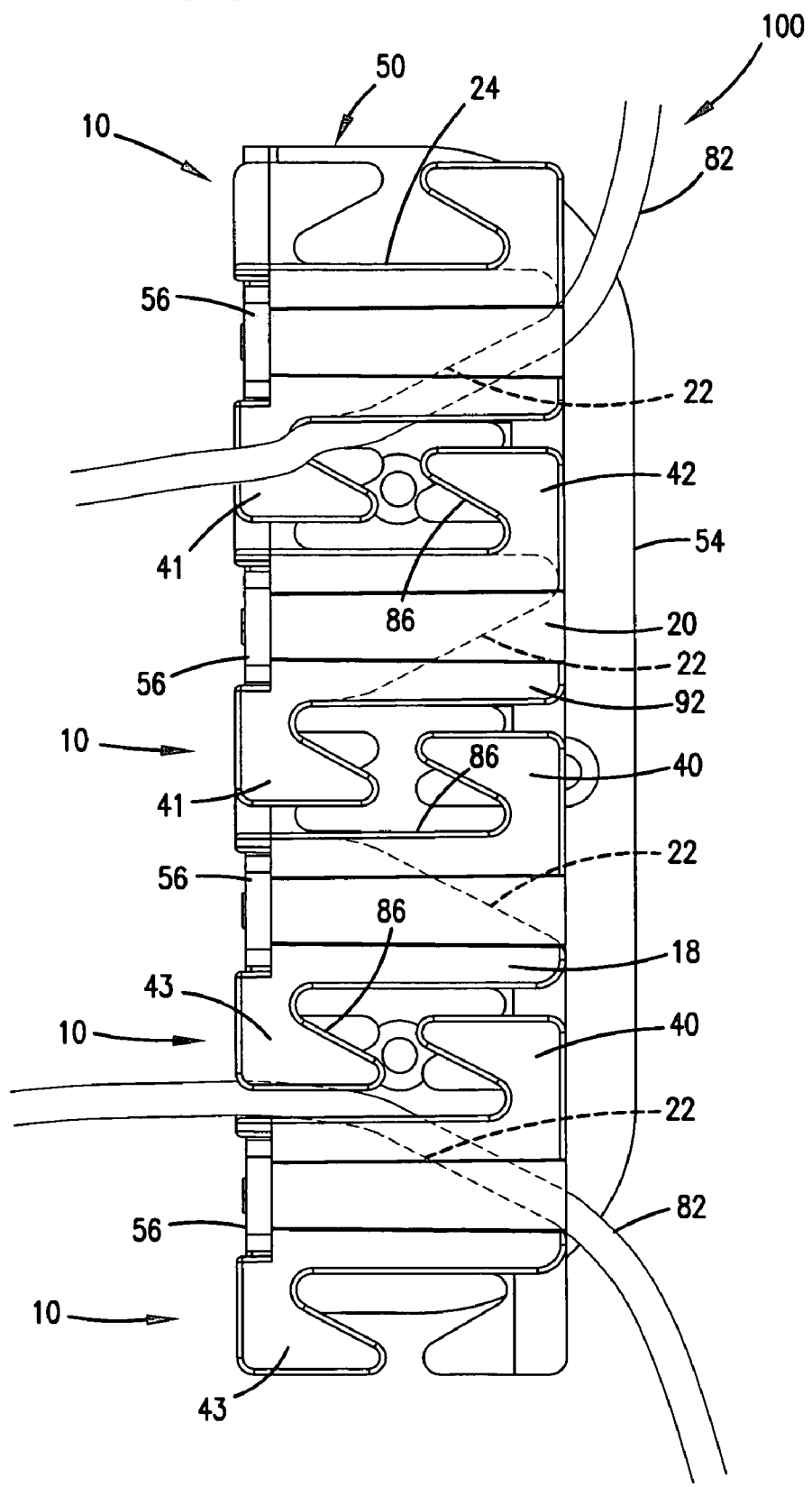
FIG. 8 is a side elevation view of the radius limiter arrangement of FIG. 7.

Referring back to FIGS. 2 and 3, the forward and rearward tabs 40-43 located at the sides 18, 20 of the radius limiter body 12 have a cutout region 84. The cutout region 84 defines an access channel 86 (FIG. 8) when the plurality of cable radius limiters 10 are stacked relative to one another. As shown in FIG. 8, the access channel 86 forms a Z-shaped channel. The Z-shaped channel 86 allows cables 82 to be passed through the tabs 40-43 and onto the curved surface 22 while still retaining the cables 82 between the sides 18, 20 of the cable radius limiter 10. That is, the rearward tab (41, 43) and the forward tab (40, 42) of two adjacent cable radius limiters 10, in addition to the corner portion 92 of one of the limiters 10, cooperate to provide a window (i.e., the access channel 86) through which cables 82 can be routed. The window or access channel 86, however, still prevents the cables from inadvertently falling off the cable radius limiter 10 when the cables 82 or arrangement 100 experience vibrations or movement, for example.

The above specification provides a complete description of the cable management assembly, system, and method. Since many embodiments of the invention can be made without departing from the spirit and scope of the invention, the invention resides in the claims hereinafter appended.

What is claimed is:

1. A cable radius limiter, comprising:
   a) a radius limiter body having a front, a rear, and opposite sides, the radius limiter body including a first curved surface and a second generally planar surface, the first and second surfaces extending away from the rear of the body and converging at the front of the body;
   b) mounting structure accessible at the rear of the radius limiter body, the mounting structure being located along a centerline of the radius limiter body so that the cable radius limiter can be operably oriented in both a first mounting orientation and a second mounting orientation; and
   c) cable retaining structure located at the sides of the radius limiter body, the cable retaining structure being arranged such that the cable radius limiter can be operably oriented in both the first mounting orientation and the second mounting orientation.

2. The cable radius limiter of claim 1, wherein the first and second surfaces are spaced apart at the rear of the radius limiter body, the first and second surfaces defining a volume.

3. The cable radius limiter of claim 2, wherein the mounting structure is located within the volume of the radius limiter body.

4. The cable radius limiter of claim 1, wherein the cable retaining structure includes at least a first tab extending in a direction generally outward from the first surface and a second tab extending in a direction generally outward from the second opposite surface.

5. The cable radius limiter of claim 1, wherein the cable retaining structure includes at least a first tab located adjacent to the first surface at the front of the radius limiter body, and a second tab located adjacent to the second surface at the front of the radius limiter body.

6. The cable radius limiter of claim 1, wherein the cable retaining structure includes a forward tab and a rearward tab located adjacent to the first surface, and a forward tab and a rearward tab located adjacent to the second surface.

7. The cable radius limiter of claim 1, wherein the first mounting orientation is 180 degrees relative to the second mounting orientation.

8. The cable radius limiter of claim 1, wherein the curved surface can be operably oriented in an upward direction and in a downward direction.

9. A radius limiter arrangement for managing cable of a telecommunications system, the arrangement comprising:
   a) mounting structure having a planar mounting surface, the planar mounting surface being defined by spaced apart fingers; and
   b) a plurality of cable radius limiters, each one of the plurality of cable radius limiter being secured to one of the fingers of the mounting structure, the cable radius limiters including:
      i) a body having a front, a rear, and opposite sides, the body including a radius limiting surface configured to limit bending of cables extending along the radius limiter surface; and
      ii) retaining structure arranged to retain cables between the sides of the body;
   c) wherein the cable radius limiters can be operably secured to the mounting structure in both a first mounting orientation and a second mounting orientation, in the first and second mounting orientations, the rear of the body being mounted flush with the planar mounting surface of the mounting structure, and the radius limiting surface extending away from the planar mounting surface of the mounting structure in one of an upward-curving direction and a downward-curving direction, respectively.

10. The arrangement of claim 9, wherein the mounting structure is a mounting bracket, the fingers extending outward from the mounting bracket, the mounting bracket being configured to secure the radius limiter arrangement to structure of the telecommunications system.

11. The arrangement of claim 9, wherein the mounting structure includes alignment structure, the alignment structure determining in which of the first mounting orientation or the second mounting orientation the cable radius limiter is secured.

12. The arrangement of claim 11, wherein the alignment structure is formed on each one of the fingers of the mounting structure.

13. The arrangement of claim 12, wherein the alignment structure includes a notch formed in each of the fingers, each of the cable radius limiters including an alignment pin sized for receipt within the notch of the finger.

14. The arrangement of claim 9, wherein at least one of the plurality of cable radius limiters is oriented such that the cable limiting surface is oriented in an upward direction, and at least one of the plurality of cable radius limiters is oriented in a downward direction.

15. The arrangement of claim 9, wherein each of the cable radius limiters includes mount structure for securing the limiter to one of the fingers, the mount structure being located along a centerline of the body so that the cable radius limiter can be operably secured to the finger in both the first mounting orientation and the second mounting orientation.

16. A cable radius limiter, comprising:
   a) a radius limiter body having a front, a rear opposite the front, and first and second sides, the radius limiter body including a first curved surface and a second flat surface located opposite the first curved surface, the first curved surface having a front edge located along the front of the radius limiter body and a rear edge located along the rear of the radius limiter body, the first curved surface curving in one of an upward direction and a downward direction between the front and rear edges;
   b) a first set of cable retaining tabs located adjacent to the first curved surface and a second set of cable retaining tabs located adjacent to the second flat surface;
   c) mounting structure accessible at the rear of the radius limiter body; and
   d) notches located at the rear of the radius limiter body, the notches being sized to receive bracket mounting structure.

17. The cable radius limiter of claim 16, wherein the first curved surface and the second flat surface converge at the front of the radius limiter body.

18. The cable radius limiter of claim 17, wherein the first curved surface and the second flat surface are spaced apart at the rear of the radius limiter body, the first and second surfaces defining a volume.

19. The cable radius limiter of claim 18, wherein the mounting structure is located within the volume of the radius limiter body.

20. The cable radius limiter of claim 16, wherein each of the first and second sets of cable retaining tabs includes a forward tab located adjacent to the front of the radius limiter body and a rearward tab located adjacent to the rear of the radius limiter body.

21. A cable radius limiter, comprising:
   a) a radius limiter body having a front, a rear, and opposite sides, the radius limiter body including a first curved surface and a second flat surface located opposite the first curved surface,
   b) a first set of cable retaining tabs located adjacent to the first curved surface and a second set of cable retaining tabs located adjacent to the second flat surface; and
   c) mounting structure for mounting the cable radius limiter to telecommunication mounting structure;
   d) wherein the first curved surface and the second flat surface are spaced apart at the rear of the radius limiter body, and wherein the first curved surface and the second flat surface converge at the front of the radius limiter body.

22. The cable radius limiter of claim 21, wherein the mounting structure is accessible at the rear of the radius limiter.

23. The cable radius limiter of claim 22, wherein the mounting structure is located within a volume defined by the spaced apart first and second surfaces of the radius limiter body.

24. The cable radius limiter of claim 21, wherein each of the first and second sets of cable retaining tabs includes a forward tab located adjacent to the front of the radius limiter body and a rearward tab located adjacent to the rear of the radius limiter body.

* * * * *